Figure 1:
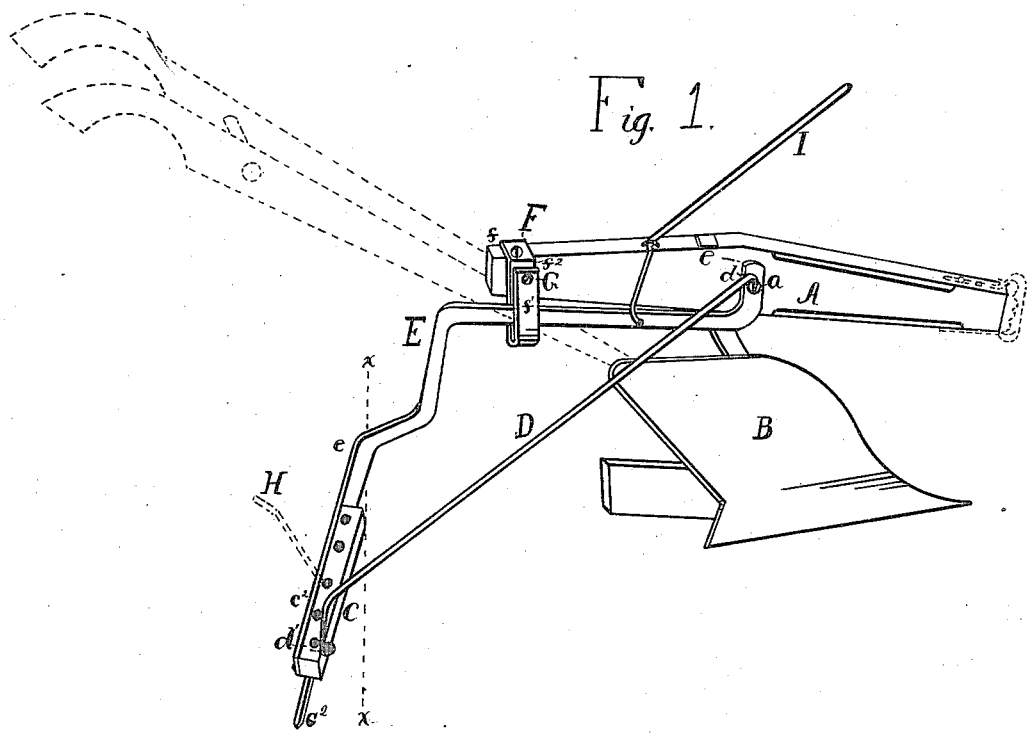

(No Model.)

C. PERKINS.
COMBINED PLOW AND HARROW.

No. 309,248. Patented Dec. 16, 1884.

UNITED STATES PATENT OFFICE.

CHARLES PERKINS, OF SPRINGFIELD, MISSOURI.

COMBINED PLOW AND HARROW.

SPECIFICATION forming part of Letters Patent No. 309,248, dated December 16, 1884.

Application filed March 18, 1884. (No model.)

*To all whom it may concern:*

Be it known that I, CHARLES PERKINS, a citizen of the United States, residing at Springfield, in the county of Greene and State of Missouri, have invented certain new and useful Improvements in a Combined Plow and Harrow; and I do hereby declare the following to be a full, clear, and exact description of the invention, such as will enable others skilled in the art to which it appertains to make and use the same.

My invention relates to improvements in forming implements, the object of which is to provide a simple, durable, and convenient means of securing a harrow to the beam of a plow, so as to harrow the ground as it is turned, and to prevent throwing dirt into the furrow, and at the same time to reduce the side draft upon the plow to its minimum, and also to provide a harrow that is self-adjusting. These objects I attain by means of the device illustrated in the accompanying drawing, forming a part of this specification, in which the figure is a view in elevation, showing the entire device, the dotted lines showing the construction for a walking-plow.

A represents a plow-beam of a sulky or walking plow, B the share of the same, and C a harrow.

The distinctive features of my invention consist in two rods or supports rigidly attached to the ends of the said harrow, which hold it at an angle with the line at right angles with the furrow, said supports being made long and attached forward on the plow-beam to reduce the side draft, and the inner one resting in a clevis, all constructed and arranged as hereinafter more fully explained.

D is a supporting-rod attached to the plow-beam by a bolt or equivalent device, $a$, and thence extends backward and outward, having the other end, $d'$, attached at or near the outer end of the harrow.

E is a supporting-rod having its front end, $e$, secured to the said bolt $a$. It then extends back along the beam through a clevis, F, and thence is bent downward and outward, and extends backward, and is secured to the inner end, $c$, of the harrow, or, as shown, extends along the back of the same.

The harrow is made of sufficient width to cover one furrow at a time. It is placed back of the plow upon the earth from the furrow, being turned so as to lessen the side draft upon the plow. It is hung by the supports, so that the outer end extends back of the line $x\ x$, which is at right angles with the furrow, thus throwing the dirt from the furrow. The teeth $c^2$ are bent backward, as shown, to assist in throwing the dirt from the furrow, and to prevent their catching and holding onto roots, &c. The clevis F is secured to or over the back part of the beam, as shown. This clevis may be made of any suitable material, preferably of a metal that will spring, and has a set-screw, G, or equivalent device, for preventing the rod E, which works up and down in the said clevis, from flying out, and when desired, as on smooth level ground, the screw may be set to hold the rod and its attached harrow in any desired place.

I is a lever for raising the harrow from the ground to let off weeds, &c. One end has suitable attachments to the rod E, the other extending forward to be operated by the driver.

In a walking-plow I attach a handle (represented by a dotted line, H,) to the harrow for raising the same from behind.

The device thus constructed levels the ground as it is turned without throwing dirt into the furrow, and avoids the great side draft on the plow in harrows which have heretofore been constructed for the same purpose.

Having thus described the construction, use, and operation of my invention, what I claim as new, and desire to secure by Letters Patent, is—

1. A harrow, C, having a handle, H, teeth inclined backward, and rods D E, rigidly attached to its ends, said rods being secured to the plow-beam, so as to hold the said harrow behind the plow on the dirt being turned from the furrow, in combination with a clevis, F, secured to the back part of a plow-beam, for securing the rod E, and having a set-screw, G, for adjusting and rigidly holding the said harrow in the desired position, substantially as shown and described.

2. The combination of a plow having attached rods D E, and a harrow, C, having the said rods attached rigidly to its ends, to hold said harrow upon the furrow being turned, and a clevis, F, secured to the back part of
5 the plow-beam, having a set-screw, G, all arranged and constructed for holding firmly the harrow in its place, substantially as and for the purpose set forth.

In testimony whereof I affix my signature in presence of two witnesses.

CHARLES PERKINS.

Witnesses:
SEWARD A. HASELTINE,
HENRY C. YOUNG.